US009734046B2

United States Patent
Karle et al.

(10) Patent No.: US 9,734,046 B2
(45) Date of Patent: Aug. 15, 2017

(54) RECORDING, REPLAYING AND MODIFYING AN UNSTRUCTURED INFORMATION MANAGEMENT ARCHITECTURE (UIMA) PIPELINE

(71) Applicant: International Business Machines Corporation, Armonk, NY (US)

(72) Inventors: Christopher James Karle, Wayland, MA (US); William Graham O'Keeffe, Tewksbury, MA (US); David Deidou Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/242,488

(22) Filed: Apr. 1, 2014

(65) Prior Publication Data
US 2015/0277901 A1    Oct. 1, 2015

(51) Int. Cl.
G06F 9/44 (2006.01)
G06F 11/36 (2006.01)
G06Q 10/00 (2012.01)

(52) U.S. Cl.
CPC ...... *G06F 11/3688* (2013.01); *G06F 11/3664* (2013.01); *G06Q 10/00* (2013.01)

(58) Field of Classification Search
None
See application file for complete search history.

(56) References Cited

U.S. PATENT DOCUMENTS

| 6,392,665 | B1* | 5/2002 | Argabright ........... G11B 27/034 715/723 |
| 7,100,027 | B1* | 8/2006 | Padwekar ........... G06F 11/3688 712/227 |
| 8,280,903 | B2 | 10/2012 | Broder et al. |
| 2001/0052108 | A1* | 12/2001 | Bowman-Amuah .. G06Q 10/06 717/100 |
| 2004/0243556 | A1 | 12/2004 | Ferrucci et al. |
| 2004/0243557 | A1* | 12/2004 | Broder ................ G06F 17/2785 |
| 2004/0243645 | A1 | 12/2004 | Broder et al. |

(Continued)

FOREIGN PATENT DOCUMENTS

WO    2010089248    12/2010

OTHER PUBLICATIONS

Sahay, "Socio-Semantic Conversational Information Access," Georgia Institute of Technology Dec. 2011.*

(Continued)

*Primary Examiner* — Insun Kang
(74) *Attorney, Agent, or Firm* — Reza Sarbakhsh; David H. Judson; Jeffrey S. LaBaw

(57) ABSTRACT

The technique herein substantially improves productivity of Annotator developers by providing methods and systems to develop and test Annotators without having to run a full pipeline every time changes are made to a particular Annotator. To this end, preferably a running pipeline is instrumented to enable automated recording of static configuration and dynamically-generated event data as the pipeline is executed. Based on these data, a reusable data model is generated that captures code and other dependencies in the pipeline (e.g., configuration parameters, intermediary CASes, program flow, annotations, and the like). The data model is then used to facilitate testing of Annotators without using the full pipeline (or even major sub-pipelines therein).

15 Claims, 5 Drawing Sheets

(56) References Cited

U.S. PATENT DOCUMENTS

| | | | |
|---|---|---|---|
| 2005/0131667 A1* | 6/2005 | Woodring | G06F 17/5009 703/22 |
| 2006/0074622 A1* | 4/2006 | Scott | G06F 11/3636 703/23 |
| 2007/0112819 A1 | 5/2007 | Dettinger et al. | |
| 2007/0220338 A1* | 9/2007 | Birmiwal | G06F 17/5022 714/33 |
| 2008/0092119 A1* | 4/2008 | Sweis | G06F 8/74 717/124 |
| 2008/0301651 A1* | 12/2008 | Seneski | G06F 11/366 717/135 |
| 2009/0222441 A1 | 9/2009 | Broder et al. | |
| 2010/0235820 A1* | 9/2010 | Khouzam | H04N 21/4143 717/148 |
| 2013/0054285 A1 | 2/2013 | Oberhoffer et al. | |
| 2015/0095882 A1* | 4/2015 | Jaeger | G06F 8/34 717/109 |

OTHER PUBLICATIONS

Batista-Navarro, et al, "Facilitating the Analysis of Discourse Phenomena in an Interoperable NLP Platform," The National Centre for Text Mining, The University of Manchester, CICLing 2013, Part I, LNCS 7816, pp. 559-571, 2013.

Wachsmuth et al, "Automatic Pipeline Construction for Real-Time Annotation," Universitat Paderborn, s-lab, Software Quality Lab, Paderborn, Germany, CICLing 2013, Part I, LNCS 7816, pp. 38-49, 2013.

Yan, L., et al, "Research and Implementation of UIMA-based Knowledge Discovery Framework," 2010.

"LanguageWare Resource Workbench 7.2—Create a UIMA pipeline configuration," IBM, 2011.

Apache Solr—Reference Guide 4.1, Lucidworks, pp. 164, and 224-226, 2013.

* cited by examiner

RECORDING, REPLAYING AND MODIFYING AN UNSTRUCTURED INFORMATION MANAGEMENT ARCHITECTURE (UIMA) PIPELINE

BACKGROUND OF THE INVENTION

Technical Field

This disclosure relates generally to development and testing of computer software components for Natural Language Processing (NLP)-based information systems.

Background of the Related Art

The Unstructured Information Management Architecture (UIMA) is a specification that standardizes a software system framework for performing complex content analytics on unstructured data. The main idea of UIMA is that a document is submitted to a pipeline that is comprised of an ordered set of Annotators and Controllers. Each Annotator is invoked sequentially or in parallel, providing annotations on the content and recording them along the way in the document. Optionally, an Annotator can use the results of other Annotators (that have been executed before it in the pipeline), and adds its own output, if any, to the collective data set for further operations. UIMA pipelines vary in size and complexity, and it is not uncommon to have pipeline of substantial size that requires a large amount of time to initialize and run. For example, the Natural Language Processing (NLP)-based Question/Answering system IBM® Watson may contain up to 300 Annotators and takes several minutes or more to initialize and run. Such computational requirement causes productivity problems for Annotator developers who must restart the pipeline every time they make a change, no matter how small, to a particular Annotator. As a result, a developer typically works on one or more parts of the pipeline, spending time to create and configure an environment suitable for testing his or her particular change. Beside the time needed to maintain these partial pipelines, developers have had mixed results in the efficiency of these test environments. Moreover, developers still must complete their testing with a full pipeline to be confident of the final results. Current development and testing systems do not adequately satisfy these needs.

BRIEF SUMMARY

The technique herein substantially improves productivity of Annotator developers by providing methods and systems to develop and test Annotators without having to run a full pipeline every time changes are made to a particular Annotator. To this end, preferably a running pipeline is instrumented to enable automated recording of static configuration and dynamically-generated event data as the pipeline is executed. Based on these data, a reusable data model is generated that captures code and other dependencies in the pipeline (e.g., configuration parameters, intermediary CASes, program flow, annotations, and the like). The data model is then used to facilitate testing of Annotators without using the full pipeline (or even major sub-pipelines therein).

Thus, for example, in one embodiment, a developer uses the data model to recreate conditions running with the full pipeline (i.e., to "replay" the pipeline, or some portion thereof) but without requiring the pipeline to be re-initialized and then executed in an end-to-end manner. By using the data model, a developer simulates the conditions running with the full pipeline but with respect to a particular Annotator. The developer thus can test that Annotator as if it were executing within the running pipeline but without having to perform such initialization and execution activities, which are often very time-consuming, resource-intensive, and costly. Using the data model, many other replay scenarios (or, more generally, pipeline simulations) can be carried out. Thus, in another embodiment, a developer selects a given Annotator for deletion and simulates how the pipeline runs without that Annotator. In yet another embodiment, a developer selects an Annotator for inclusion in the full pipeline and simulates how the pipeline runs with that included Annotator. In still another embodiment, the developer selects a first Annotator for deletion and a second Annotator for inclusion, and then runs a simulation to determine the effects (e.g., on an Analysis Engine) of these replacements. Yet another embodiment enables the developer to perform conditional stop execution on an Annotator based on particular CAS events. These are merely representative replay scenarios. In each case, however, the simulations are executed without modifying pipeline descriptors and without requiring initialization and execution of the entire pipeline.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
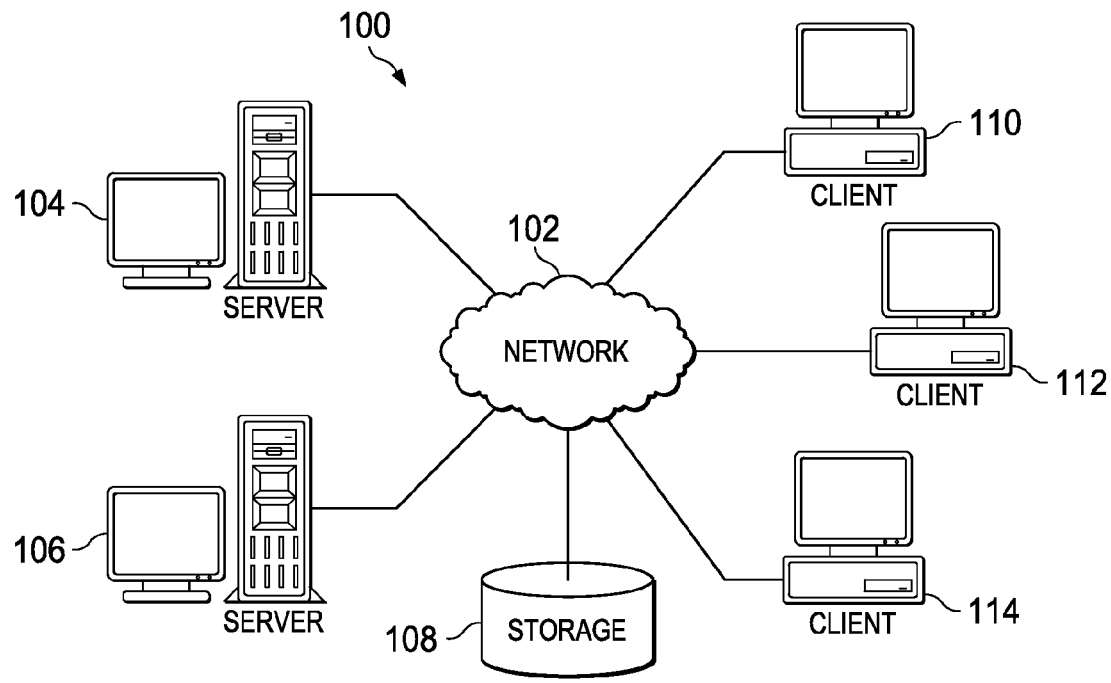
FIG. 1 depicts an exemplary block diagram of a distributed data processing environment in which exemplary aspects of the illustrative embodiments may be implemented.
Figure 2:
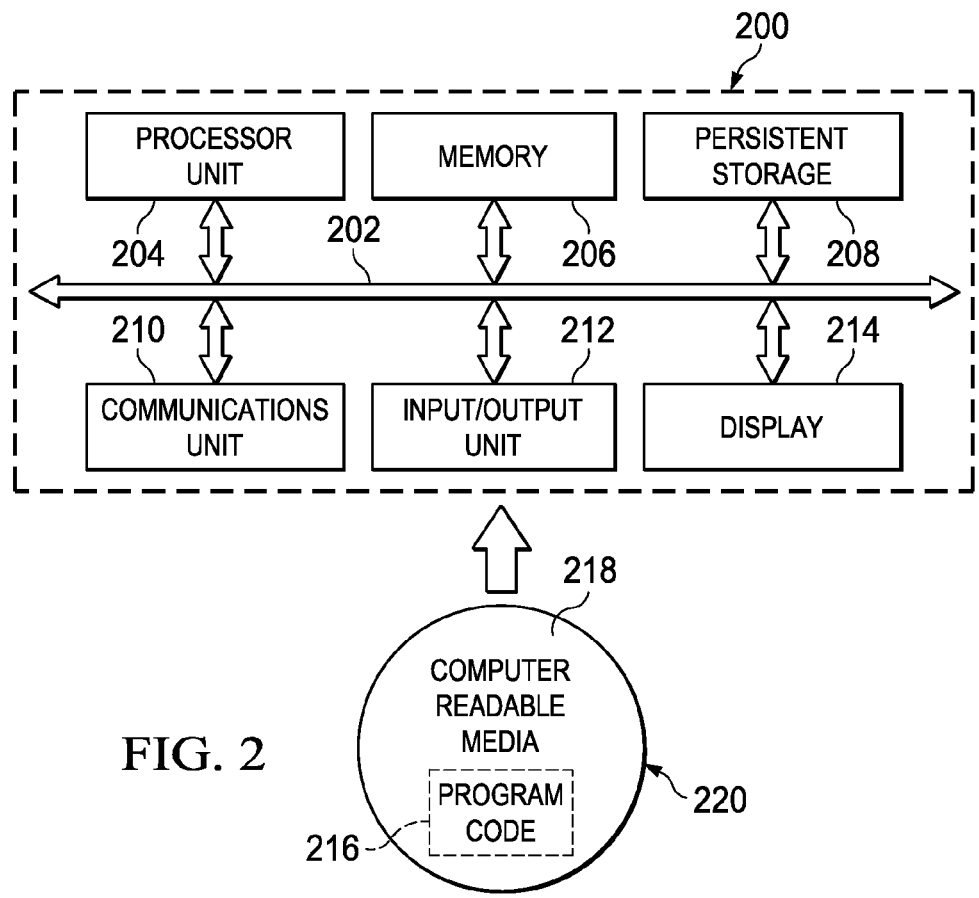
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Question Answering

As will be described, the UIMA techniques described below may be used to facilitate the development and testing of methods and system for analyzing unstructured content. One known technique for such analysis involves natural language processing.

By way of additional background, question answering (or "question and answering," or "Q&A") is a type of information retrieval. Given a collection of documents (such as the World Wide Web or a local collection), a Q&A system should be able to retrieve answers to questions posed in natural language. Q&A is regarded as requiring more complex natural language processing (NLP) techniques than other types of information retrieval, such as document retrieval, and it is sometimes regarded as the next step beyond search engines. Closed-domain question answering deals with questions under a specific domain (for example, medicine or automotive maintenance), and it can be seen as an easier task because NLP systems can exploit domain-specific knowledge frequently formalized in ontologies. Open-domain question answering deals with questions about nearly everything, and they can only rely on general ontologies and world knowledge. These systems usually have much more data available from which to extract the answer. Systems of this type are implemented as a computer program, executed on a machine. Typically, user interaction with such a computer program either is via a single user-computer exchange, or a multiple turn dialog between the user and the computer system. Such dialog can involve one or multiple modalities (text, voice, tactile, gesture, or the like). Examples of such interaction include a situation where a cell phone user is asking a question using voice and is receiving an answer in a combination of voice, text and image (e.g. a map with a textual overlay and spoken (computer generated) explanation. Another example would be a user interacting with a video game and dismissing or accepting an answer using machine recognizable gestures or the computer generating tactile output to direct the user. The challenge in building such a system is to understand the query, to find appropriate documents that might contain the answer, and to extract the correct answer to be delivered to the user.

In the past, understanding the query was an open problem because computers do not have human ability to understand natural language, nor do they have common sense to choose from many possible interpretations that elementary natural language understanding systems can produce. A solution that addresses this problem is IBM Watson, which may be described as, among other things, as an open-domain Q&A system that is an NLP artificial intelligence (AI)-based learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers.

A representative Q&A system, such as described in U.S. Pat. No. 8,275,803, provides answers to questions based on any corpus of data. The method facilitates generating a number of candidate passages from the corpus that answer an input query, and finds the correct resulting answer by collecting supporting evidence from the multiple passages. By analyzing all retrieved passages and that passage's metadata in parallel, there is generated an output plurality of data structures including candidate answers based upon the analyzing step. Then, by each of a plurality of parallel operating modules, supporting passage retrieval operations are performed upon the set of candidate answers; for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers.

In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis.

Unstructured Information Management Architecture (UIMA) Pipelines

As noted above, UIMA stands for Unstructured Information Management Architecture. It is a component architecture and software framework implementation for the analysis of unstructured content such as text, video, audio and the like. The framework, originally developed by IBM and now an open source Apache project, provides a common platform for unstructured analytics, enables reuse of analysis components, and reduce duplication of analysis development. It is pluggable architecture that allows developers to plug analysis components, and to combine them together with other such components. The framework enables an analysis task (which may not be monolithic) to be carried out by a multi-stage process where different modules build on each other to provide a more powerful analysis chain, or "pipeline." In some cases, analysis components from different specialized vendors may need to work together to produce the results needed. Machines operating such components may be located remote from one another. Often, the UIMA application interested in such analysis results does not need to know the details of how individual analysis components work together to create the results. The UIMA framework takes care of the integration and orchestration of multiple components.

UIMA provides a standards-based architecture and software framework for creating, discovering, composing and deploying a broad range of multi-modal analysis capabilities and integrating them with search technologies. Apache UIMA Framework is an available open source Java reference implementation that can be used to develop, describe, compose and deploy UIMA components and applications. The framework also provides a developer with an Eclipse-based development environment that includes a set of tools and utilities for using UIMA.

UIMA specifies component interfaces in an analytics pipeline. In UIMA, an Analysis Engine (AE) is a program that analyzes artifacts and infers information from them. An artifact is an unstructured item being analyzed by an annotator. It could be an HTML web page, an image, a video stream, a recorded audio conversation, an MPEG-4 stream, a document or some portion thereof, or the like. Analysis Engines are constructed from building blocks called Annotators. An Annotator, which is a set of computer instructions that contains analysis logic, analyzes an artifact and creates additional data about that artifact. An Analysis Engine (AE) may contain one or many Annotators. An Annotator produces its analysis result in the form of a Feature Structure, which is a data structure that has a type and a set of attribute-value pairs. An Annotation is a type of Feature Structure that is attached to a region of the artifact being analyzed, such as a span of text in a document. All Feature Structures, including Annotations, are represented in a UIMA Common Analysis Structure (CAS), which is the primary data structure through which all UIMA components communicate. The CAS may be described as a common data structure share by UIMA framework components and that encapsulates analysis results shared across the various UIMA components. Typically, the CAS is an in-memory representation of the artifact being analyzed and, as noted above, includes content and metadata information in the form of Annotations, with the CAS being supplied (generated) by a sequence of Annotators that each add metadata based on their own specific analysis logic and wherein subsequent Annotators build on the results from prior Annotators in the flow. The Apache UIMA framework provides a native Java interface to the CAS, and that interface represents each Feature Structure as a Java object.

Generally, a developer can develop and test a UIMA Annotator by defining the CAS types that the Annotator will use, generate the Java classes for these types, write the actual annotator Java code, create an Analysis Engine descriptor, and test the Annotator.

A UIMA pipeline is based on a UIMA pipeline configuration. A UIMA pipeline configuration file is a placeholder for resources used to annotate documents. It contains different stages (e.g., language, lexical analysis, parsing rules and clean-up). The stages are run consecutively and interact together to generate annotations. The UIMA pipeline configuration is often referred to a UIMA pipeline.

Figure 3:
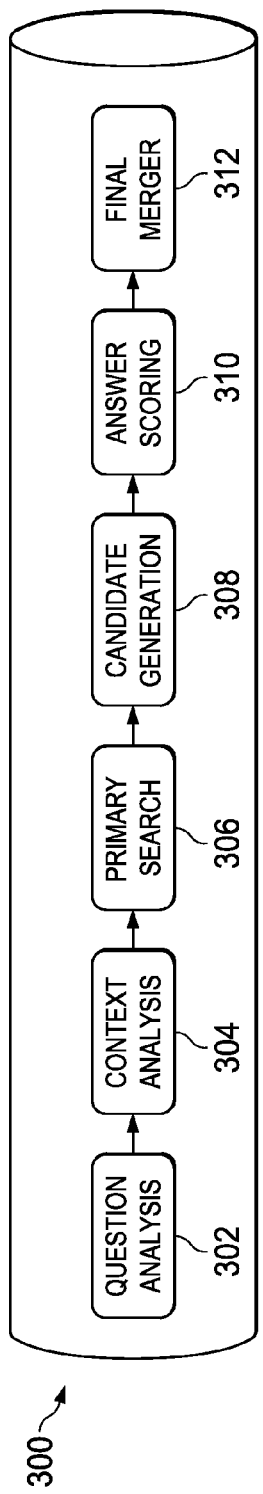
FIG. 3 illustrates a representative UIMA pipeline comprising a set of building blocks (Annotators)

FIG. 3 illustrates a representative pipeline in the context of a NLP-based question answering system such as IBM Watson. In this example, the pipeline comprises a set of Annotators. A first Annotator 302 performs question analysis. The output of the first Annotator is provided to a second Annotator 304 that performs context analysis. The output of the second Annotator is then provided to a third Annotator 306 that performs a primary search function. The output of the search logic is then provided to a fourth Annotator 308 that applies candidate generation logic on the results of the searching. The output of the fourth Annotator is then provided to a fifth Annotator 310 that provides answer scoring logic. The final results of the analysis are then merged by a sixth and final Annotator 312 to obtain an output. Throughout this process, the pipeline maintains the CAS as an in-memory representation. The individual Annotators are each typically implemented as software executing in a hardware element, such as by using the data processing system shown in FIG. 2. Individual Annotators may operate in different machines and need not be co-located. Individual Annotators may be developed by different developers or developer entities, who may or may not cooperate with one another during the development and testing of Annotators and the pipeline.

A UIMA pipeline configuration is created and configured using a tool, such as IBM® LanguageWare® Resource Workbench. Using an Explorer tool, the user navigates to Project/Configuration/Annotators directory, and then selects "New/UIMA Pipeline Configuration." Using the display interface, the user names the UIMA Pipeline configuration, and can select whether to include a parsing rules stage in the pipeline. When finished, the tool creates an .annoconfig file.

The UIMA Pipelines configuration has four (4) main stages (Document Language, Lexical Analysis, Parsing Rules and Clean-up stage). The pipeline will not run unless the proper resources have been added. Using a first panel in the display interface, a user first makes a Document Language selection and, in particular: (i) whether the document language configuration is automatically determined (using a selected Acceptable Language), (ii) determined using a specified dictionary, or (iii) specified manually (e.g., "English"). Then, using a second panel in the display interface, a user then makes a Lexical Analysis selection, specifying the dictionary resources that will be used in the pipeline. The system may include built-in dictionaries for different languages and that cover Lexical Analysis. To add custom dictionaries, the user can open a workspace browser to obtain and add the relevant resources to the pipeline. Dictionaries from an Explorer function may be inserted into the pipeline configuration as well. Using another panel in the display interface, the user continues to configure the Parsing rules. To add a parsing rules database, the user can select to open the workspace browser to obtain and add the relevant resources. The user can also identify and drag a .jar file into the Parsing rules field. Using another panel in the display interface, the user enters the Clean-up stage. In this stage, the user can select the Types (concepts) that are to be shown or hidden when annotating documents. This is useful when there are intermediate Types that the user does not want to see annotated in the final output of the document analysis. After all the resources have been added to the UIMA pipeline configuration, the configuration is saved.

When a LanguageWare engine is in use, for example, in a Q&A system, the above-described stages typically are contained within one of the stages shown in FIG. 3, such as the Question Analysis.

Recording, Replaying and Modifying a UIMA Pipeline

With the above as background, the subject matter of this disclosure is now described.

The techniques herein assume the existence of a UIMA pipeline that is assembled from building blocks (Annotators), and those building blocks may themselves be created or sourced from multiple entities. Annotators may execute on different machines.

The subject matter herein substantially enhances productivity of Annotator developers by providing techniques and tools that obviate running a full pipeline every time a developer makes a change to a particular Annotator. In general, this is achieved by automatically recording various states from a running UIMA pipeline and enabling replay of a particular Annotator, e.g., by recreating conditions of the Annotator running in a full pipeline. As will be seen, the approach provides the further advantage of enabling other pipeline modifications (e.g., adding or removing Annotators without modifying existing descriptors) that are not otherwise possible without pipeline re-start, as well as conditional stop execution on an Annotator based on CAS events such as specific feature read, write and delete.

Figure 4:
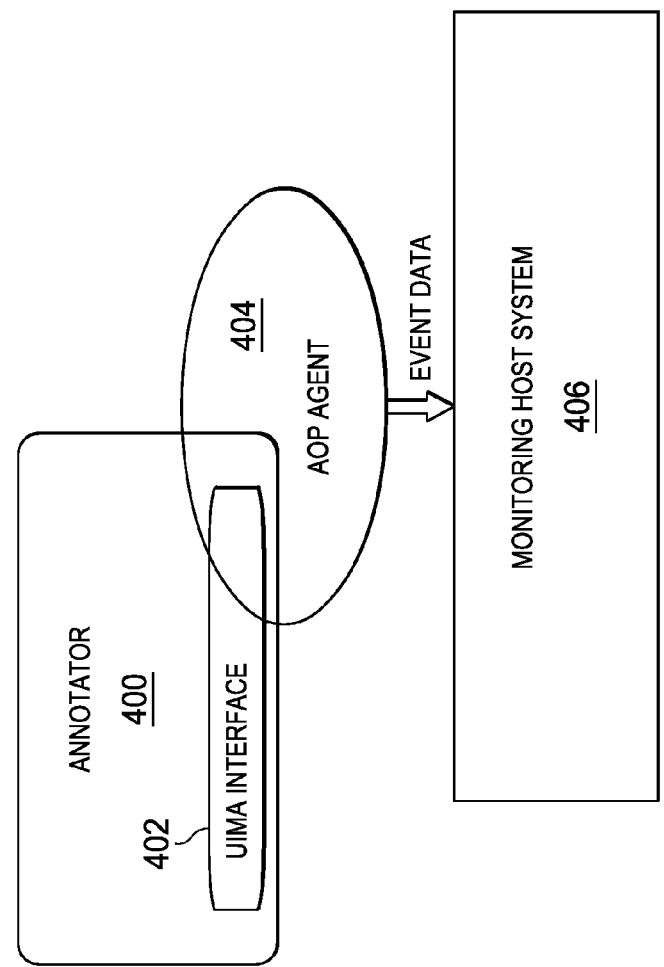
FIG. 4 illustrates an Annotator in the UIMA pipeline that is instrumented according to the techniques of this disclosure to capture events.

As described above, it is assumed that an analytics pipeline has been configured and includes a set of Annotators. A representative pipeline is as shown in FIG. 3. An Annotator executes in one or more machines, and there may be multiple machines operating in a distributed manner (whether co-located or remote from one another). According to this disclosure and as illustrated in FIG. 4, an Annotator (and potentially each Annotator in the pipeline) 400 is instrumented at its standard UIMA interface 402 in a manner so as to capture additional information generated during the processing of the analysis logic therein. The Annotator 404 is instrumented by a software agent 404 that wraps the Annotator, preferably using Aspect Oriented Programming (AOP) techniques. The software agent captures low-level UIMA events that occur as the Annotator processes its analysis logic against the input received by the Annotator. In computing, aspect-oriented programming (AOP) involves breaking down program logic into distinct parts or so-called "concerns," which cohesive areas of functionality. AOP implementations provide "crosscutting" expressions that encapsulate each concern in one place, which is called an aspect. An aspect may modify the behavior of other code (the non-aspect part of a program) by applying advice (additional behavior) at various join points (points in a program) specified in a quantification or query called a point-cut. In AOP, whenever program execution reaches one of the join points described in the point-cut, a piece of code (the "advice") associated with the point-cut is executed. AOP techniques are used herein to create point-cuts and advices in tactically-chosen low-level UIMA application programming interfaces (APIs). As a result, event data is thrown off by the software agent, which calls back to a monitoring host system 406. The monitoring host system 406 receives similar callbacks from one or more other Annotators that are provisioned in a similar manner (to capture event data using AOP point-cuts and advices).

While instrumenting an Annotator using an AOP-based software agent is a preferred technique to capture event data, other event data capture techniques may be used. Thus, for example, an Annotator may be provided with built-in (native) event capture code.

Figure 5:
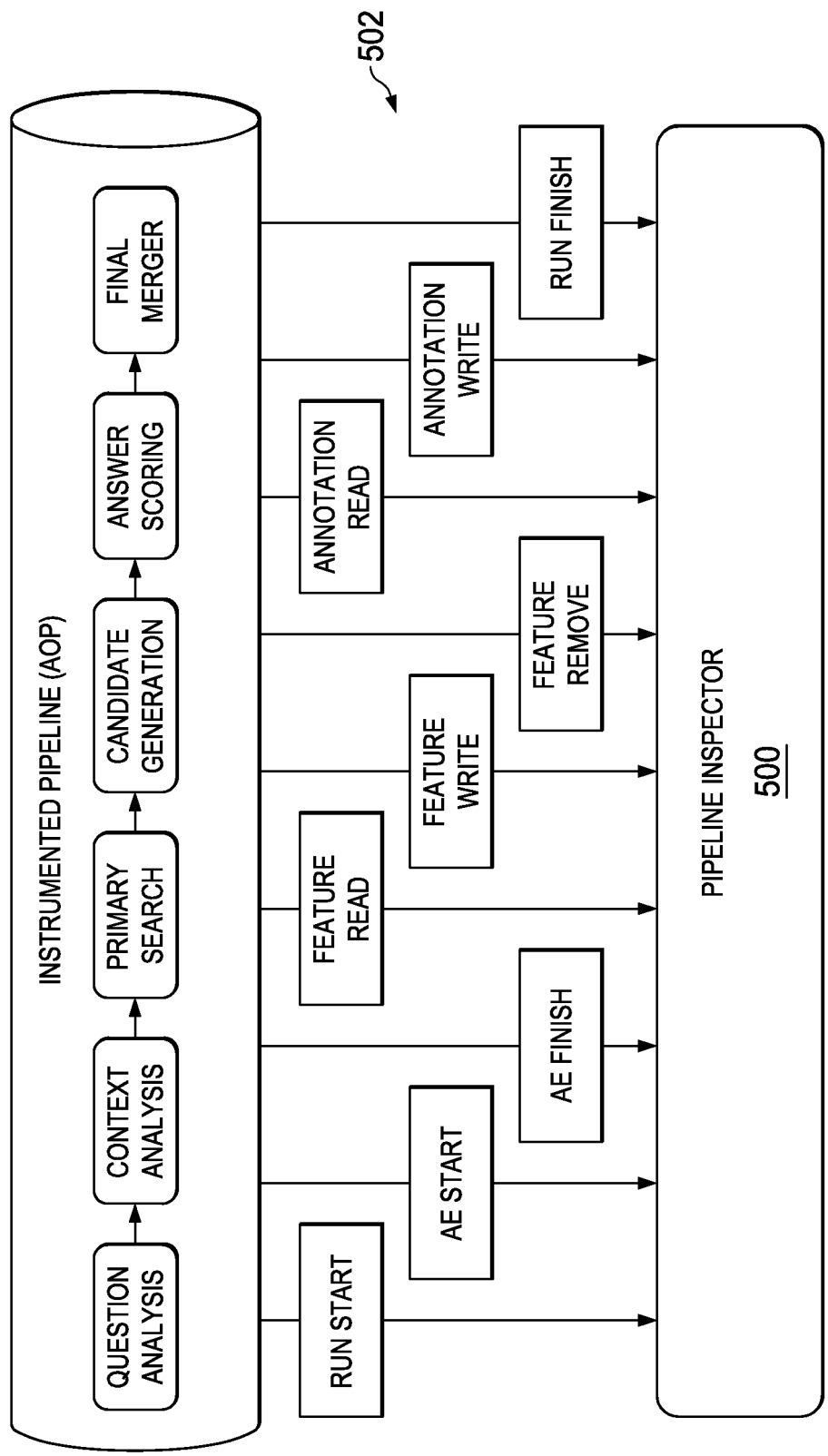
FIG. 5 illustrates a representative use case illustrating the basic principle of the disclosure wherein a set of Annotators are instrumented to capture events that are collected and analyzed by a pipeline inspector.

In this manner, each of set of Annotators in the pipeline generates event data, which data is then captured at the monitoring host system 406. As will be described below, the monitoring host system may comprise one or more machines, applications, processes and associated databases. One of these applications is a pipeline inspector 500 as illustrated in FIG. 5, which operates to receive the events 502 (e.g., Run Start, AE Start, AE Finish, Feature Read, Feature Write, Feature Remove, Annotation Read, Annotation Write, and Run Finish) illustrated. Of course, the type of events associated with the AOP callbacks will depend on the Annotator logic, the position within the pipeline, the particular API provisioned, and the like. The event data, in the aggregate, is sometimes referred to herein as an "information map" that describes a "state" of the pipeline (or some portion thereof). In addition, and according to a further aspect of this disclosure, any intermediary CAS generated as a result of execution of a particular Annotator also is captured by the pipeline inspector. Further, configuration parameters, Type System configuration data, and the like (static information) also is collected. In general, the pipeline inspector then performs static analysis of the UIMA descriptors (associated with the intermediary CAS), together with a run-time analysis of the pipeline events 502 themselves.

Preferably, a full-run of the pipeline is carried out (end-to-end) to create the largest possible information map (based on the dynamically-generated events). Preferably, the end-to-end run of the pipeline is performed multiple time (perhaps with different input data sets) to exercise as many code paths as possible. As the full pipeline is exercised in this manner, more and more code paths are tested, and further code dependencies are then expressed in the information map. The information map, which describes these code dependencies, may then be used to generate a reusable data model that can be "replayed" to facilitate Annotator development and testing, as will be described in more detail below.

Although end-to-end execution of the pipeline (even multiple times, with different input datasets) is preferred, this is not required, as the techniques herein may be applied to sub-pipelines (or, more generally, any portions of the pipeline that are capable of being run autonomously in a sand-boxed manner).

Figure 6:
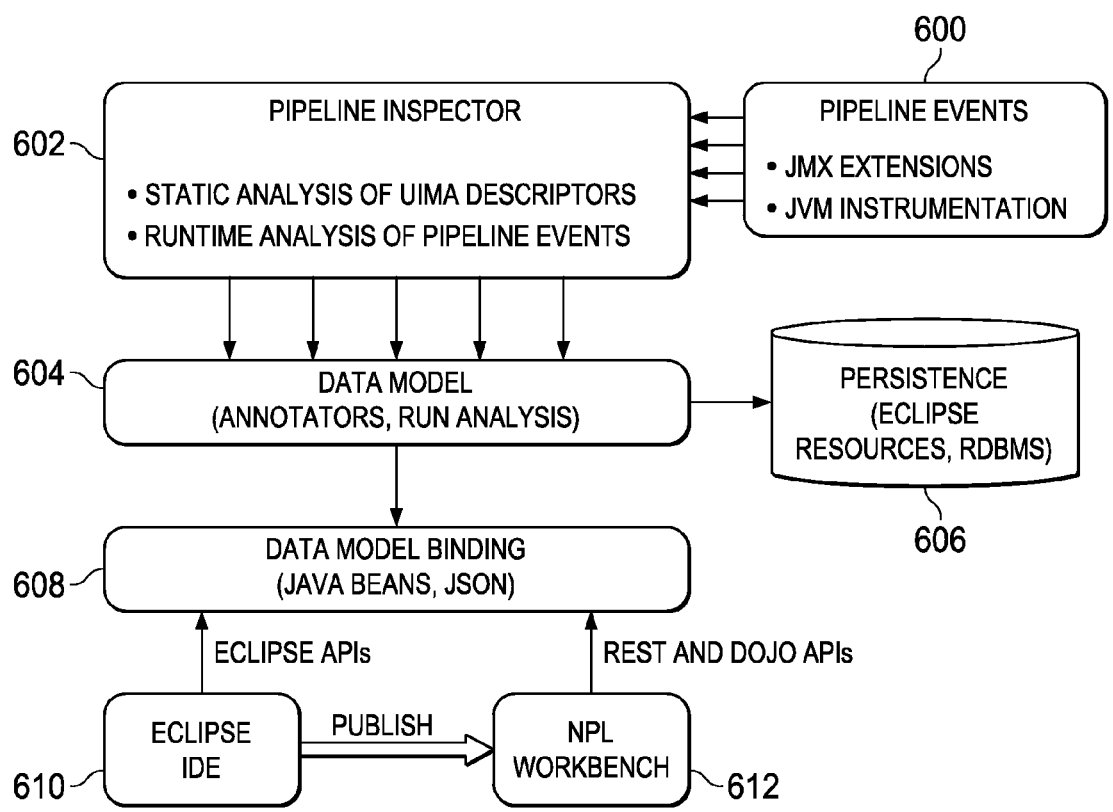
FIG. 6 illustrates the operation of the pipeline inspector.

FIG. 6 illustrates how the UIMA pipeline inspector may be used in a NPL-based system. This is a representative use case and should not be taken to limit this disclosure. In FIG. 6, the pipeline (not shown) is provisioned using AOP to generate the callback events, and to provide the intermediary CASes and other configuration information. The pipeline events 600 are provided to the pipeline inspector 602, which performs the static analysis of the UIMA descriptors and the run-time analysis of the pipeline events, as has been described. The resulting information map, intermediary CASes and other configuration data is saved in-memory according to a data model 604, and the data is stored persistently in a database 606. Using binding technologies (e.g., Java Beans, JSON) 608, the data model (or information therein) is then made available as desired to other environments. Thus, as an example, the data may be made available for debugging purpose via integrated development environment (Eclipse IDE) APIs to an IDE 610. The data may be made available for run-time use in an NPL-based question and answer system 612 (e.g., IBM Watson Workbench).

Figure 7:
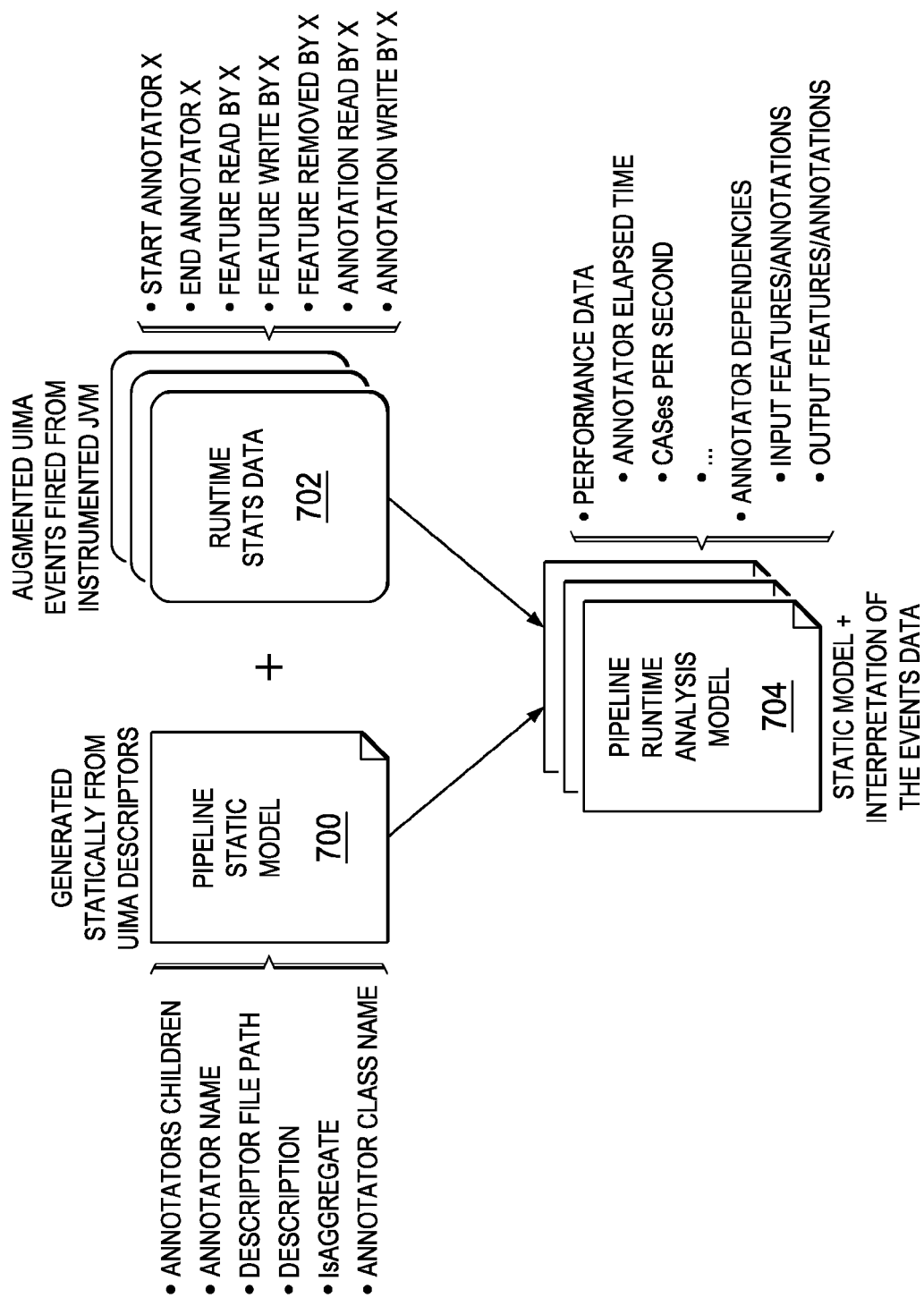
FIG. 7 illustrates a data model generated by the pipeline inspector.

FIG. 7 illustrates the output provided by the UIMA pipeline inspector in more detail. As noted, the reusable data model (generated by the pipeline inspector includes both the identified UIMA descriptors (the pipeline static model 700) generated statically, as well as the augmented UIMA events (the run-time statistics data 702) fired from instrumented code (e.g., JVM) in each instrumented Annotator. The resulting data model (the pipeline run-time analysis model 704) includes both performance data (e.g., Annotator elapsed time, CASes per second, etc.) as well as Annotator dependencies (e.g., input features/annotations, output features/annotations, etc.). Generalizing, the reusable data model captures code and other dependencies in the pipeline (e.g., configuration parameters, intermediary CASes, Type System data, program flow, annotations, and the like). The information map as defined by the data model thus describes the annotations that are being read, written or deleted from the CAS as the pipeline is being executed. The information map may be queried using conventional query tools, and responses returned. Based on the responses, the user (or an automated system) also can build a dependency tree for the pipeline in general and the Annotators in particular.

The pipeline inspector is implemented in software executing in a computing entity or entities. It is the main component responsible for instrumenting and launching the pipeline Java Virtual Machine (JVM) to fire special events designed to provide run-time analysis data (the event data), to collect and analyze these events, and to generate an in-memory pipeline run analysis (the reusable) data model that can then be serialized by a host application to perform the additional development activities. The host application may perform Annotator debugging, testing and the like. Preferably, a new pipeline inspector is instantiated and disposed for each pipeline run, but this is not a requirement, as a particular data model may receive event information (and intermediary CASes and other configuration data) from multiple (or even partial) pipeline runs.

Thus, in a typical use case, intermediary CASes and configuration parameters are captured during particular Annotation operation(s) and stored in a repository for later use. These later uses are sometimes referred to herein as "replays" and they may be quite varied. The following provides several example use cases. A replay preferably is carried out via a user interface that provides a mechanism by which a developer configures one or more replay scenarios, each of which can leverage the reusable data model that represents the state of the pipeline execution. The particular user interface may be web-based or provided by a native application executing in a graphical user interface and typically includes display panels, menus, navigation templates, workspaces, and the like.

In one example scenario, when a user wants to run a particular Annotator standalone, the system automatically uses the appropriate intermediary CASes (available in the data model) as input to this Annotator.

In another example scenario, the user can also select an Annotator for soft deletion while re-exercising the pipeline. In this case, no existing descriptor is modified; rather, the software agent associated with the selected Annotator simply bypasses the Annotator at run-time, thereby essentially replacing its execution by a no-operation (no-op). This has the same effect as if the Annotator was not present. With this approach, developers can very quickly try out new pipeline configurations without editing existing descriptors, which can be time-consuming and error prone.

As another example scenario, a user can select an Annotator to be inserted in the pipeline, choosing the order of execution. Similar to the previous case, the associated agent(s) then injects code in the Annotator that comes before, and it uses an after advice to chain a call to the inserted Annotator.

The system also allows for debugging the pipeline using, for example, the Eclipse IDE JDT tooling such as shown in FIG. 6. While the user can still use traditional debug breakpoints, the system can also conditionally stop Annotators at dynamically-computed points in time. For example, the user can choose to stop an Annotator if a particular feature is present/not present, or even if a particular feature structure has a field with a specific value, etc. There are many other types of debugging possibilities that may be implemented in a similar manner and that will help the developer increase its productivity and resolve issues faster.

Without limitation, the techniques herein may be implemented in a pipeline development environment such as IBM Watson WPDE. WPDE provides a toolset that includes an Annotator analysis tool to run and analyze any part of a pipeline. From Eclipse, developers can use the WPDE tools to select component descriptors, generate static models, and perform performance and error analysis on a pipeline or any component in a pipeline; when Annotators are instrumented according to the techniques herein, the pipeline development environment may then also be used to generate the models containing run-time analysis data, as has been described. In particular, the WPDE annotator tool provides pipeline run-time analysis capabilities for the following tasks: visually representing Annotator flow during a run, collecting elapsed time for each Annotator, showing the feature structures (input/output) for each Annotator, computing the Annotator dependencies based on features and annotations, opening the UIMA descriptor or source class for a particular Annotator, showing aggregation of data from multiple runs, such as average timing and union of all the features and dependencies, saving all CASes or saving intermediary CASes for selected Annotators, supporting dynamically-loaded Annotators and Annotators that are run multiple times, and opening the CAS in an Annotation Viewer. The Annotation Viewer is a known UIMA editor and debugging tool.

A pipeline development environment such as described includes machines, applications, processes, databases and interfaces to support the described functionality.

The subject disclosure provides significant advantages. The system enables automatic recording of a large amount of variables (e.g., intermediary CASes, configuration parameters, etc.) from a running pipeline. It enables developers to run a particular Annotator in a standalone manner, thereby re-creating the same conditions as if the Annotator were running within the full pipeline. Using this approach, developers can experiment with the pipeline, e.g., by preventing select Annotators from running (soft delete) without modifying the pipeline descriptors. The developer can then see the effect of an Annotator not being present in the pipeline. The approach further enables the developer to experiment with the pipeline by adding select Annotators (soft addition) without modifying the pipeline descriptors. In addition, the developer can experiment with the pipeline by combining soft addition and soft deletion to perform a soft replacement of a particular Annotator. This can include replacing the Annotator class or other configuration parameters in the descriptor.

In this manner, the developer is provided optimal manipulation granularity, which provides significant advantages in terms of times-saving and rapid turnaround. The disclosed subject matter preferably operates at the Annotator level, which is a larger level of granularity that is inherent to UIMA systems. The Annotators that are chained together by descriptor sets can contain numerous classes, and in fact they can be comprised of nested sets of additional Annotators. The Annotators can optionally invoke inter-process services on the same machine or on remote machines. The subject technique supports addition, removal, and replacement at these Annotator levels. With this approach, a developer can perform many different types of experiments, e.g., he or she may replace an original Annotator (e.g., comprised of dozens of classes) with another using a different set of classes, or he or she may replace one Annotator (e.g., which runs locally to the main pipeline) with another that calls out to a different machine to off-load work.

As mentioned above, UIMA pipelines can be substantial in size. In addition, the UIMA platform typically runs an initialization process that instantiates and initializes all of the Annotators in the pipeline prior to inserting the first object of work at the input. Taking the example above, e.g., a pipeline of 300 annotators taking 30 minutes for a run, imagine a developer working on an Annotator that is used at the 200th position of that pipeline. During a run of a single input item, all 300 Annotators are first created and initialized, and then 199 other Annotators perform their work before the Annotator of interest is called. This is inefficient in terms of development time, testing time, processing and storage. Prior to the techniques disclosed herein, the developer would need to restart the entire pipeline and repeat these steps—it might be 25 of the 30 minutes are repeated on any restart. With the subject disclosure, however, the 30 minute run is performed once and extensive recording of the system states captures the essence of the run. The developer working on Annotator 200 can swap in a new version of his or her work and then replay the system run by having the described technique pick up again with the state and data sets that had been presented to that Annotator and captured; this eliminates the need to run initialization on all of the system, and (in this example scenario) it also eliminates the processing of those first 199 predecessor units. The 25 minutes are reduced to seconds, freeing the developer to debug or to test and compare alternatives with very rapid turnaround times.

Each of the agent instrumentation, pipeline inspector and Annotator replay functionality described above may be implemented as a standalone approach, e.g., a software-based function executed by a processor, or it may be available as a managed service (including as a web service via a SOAP/XML interface), in whole or in part. The particular hardware and software implementation details described herein are merely for illustrative purposes are not meant to limit the scope of the described subject matter. Any aspect of this functionality may be implemented in a cloud-based manner.

More generally, computing devices within the context of the disclosed subject matter are each a data processing system (such as shown in FIG. 2, or FIG. 3) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the functionality 1 is implemented in software, which includes but is not limited to firmware, resident software, microcode, and the like. Furthermore, the device-specific functionality on either side of the channel can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the software agent, pipeline inspector and replay components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein are not limited to any particular software architecture and may be generalized for use in any framework in which individual software components are adapted to be chained (or otherwise combined) into larger functional engines or systems but wherein the individual components are capable of being developed, executed and tested in an autonomous (sand-boxed) manner. Thus, the techniques are not limited to UIMA pipelines but may be implemented with other pipeline-based software architectures exhibiting such characteristics. In any such embodiment, the pipeline software system comprises a set of software elements (components) that are adapted to be chained together.

An "element" of a pipeline software system as defined herein typically is an Annotator, but this is not a limitation. An element may also be a set of Annotators, an Analysis Engine (AE), or some other component thereof.

The references to LanguageWare and other products are not intended to be limiting. While the techniques herein can be applied to UIMA stages created from LanguageWare tools, LanguageWare stages are not required to be present. As noted above, the particular source of an Annotator may be quite varied, and the techniques herein work with Annotators irrespective of where they originate.

Having described our invention, what we now claim is as follows.

The invention claimed is:

1. A method of testing elements of a pipeline software system comprising a set of distinct elements organized end-to-end from an initial element to a final element, comprising:

as an end-to-end run of a pipeline represented by the pipeline software system executes, receiving information about a state of the pipeline software system, wherein the pipeline software system comprises an Unstructured Information Management Architecture (UIMA) pipeline and the information includes one or more intermediary Common Analysis Structure (CAS) datasets;

using the information received to generate a reusable data model representative of conditions existing along the set of distinct elements of the pipeline software system; and in association with a development action on a particular element positioned along the pipeline between the initial and final elements, and based on the reusable data model, identifying the conditions upstream of the particular element, providing the identified conditions as input to the particular element, and replaying execution of the pipeline software system without requiring initialization and re-execution of the end-to-end run of the pipeline from the initial element to the final element;

wherein the method is carried out in software executing in a hardware element.

2. The method as described in claim 1 wherein the information also includes event data generated by at least one UIMA Annotator in the UIMA pipeline.

3. The method as described in claim 2 further including instrumenting the UIMA Annotator to generate the event data.

4. The method as described in claim 1 wherein the development action is one of: executing or debugging an element in a standalone manner, running a test to determine how deletion of an element affects the pipeline, running a test to determine how adding an element affects the pipeline, running a test to determine how a conditional execution of an element affects the pipeline, and building a code dependency tree.

5. The method as described in claim 1 further including receiving additional information about the state of the pipeline software system from one or more additional runs of the pipeline software system.

6. An apparatus to test elements of a pipeline software system comprising a set of distinct elements organized end-to-end from an initial element to a final element, comprising:

a processor; and computer memory holding computer program instructions executed by the processor, the computer program instructions comprising:

code, configured as an end-to-end run of a pipeline represented by the pipeline software system executes, to receive information about a state of the pipeline software system, wherein the pipeline software system comprises an Unstructured Information Management Architecture (UIMA) pipeline and the information includes one or more intermediary Common Analysis Structure (CAS) datasets;

code, configured to use the information received to generate a reusable data model representative of conditions existing along the set of distinct elements of the pipeline software system; and code, configured in association with a development action on a particular element positioned along the pipeline between the initial and final elements, and based on the reusable data model, to identify the conditions upstream of the particular element, to provide the identified conditions as input to the particular element, and to replay execution of the pipeline software system without requiring initialization and re-execution of the end-to-end run of the pipeline from the initial element to the final element.

7. The apparatus as described in claim 6 wherein the information also includes event data generated by at least one UIMA Annotator in the UIMA pipeline.

8. The apparatus as described in claim 7 further including code to instrument the UIMA Annotator to generate the event data.

9. The apparatus as described in claim 6 further including a user interface through the development action is performed, the development action being one of: executing or debugging an element in a standalone manner, running a test to determine how deletion of an element affects the pipeline, running a test to determine how adding an element affects the pipeline, running a test to determine how a conditional execution of an element affects the pipeline, and building a code dependency tree.

10. The apparatus as described in claim 6 wherein the code configured to receive the information receives additional information about the state of the pipeline software system from one or more additional runs of the pipeline software system.

11. A computer program product in a non-transitory computer readable storage medium for use in a computing entity, the computer program product holding computer program instructions which, when executed, test elements of a pipeline software system comprising a set of distinct elements organized end-to-end from an initial element to a final element, the computer program instructions comprising:

code, configured as an end-to-end run of a pipeline represented by the pipeline software system executes, to receive information about a state of the pipeline software system, wherein the pipeline software system comprises an Unstructured Information Management Architecture (UIMA) pipeline and the information includes one or more intermediary Common Analysis Structure (CAS) datasets;

code, configured to use the information received to generate a reusable data model representative of conditions existing along the set of distinct elements of the pipeline software system; and code, configured in association with a development action on a particular element positioned along the pipeline between the initial and final elements, and based on the reusable data model, to identify the conditions upstream of the particular element, to provide the identified conditions as input to the particular element, and to replay execution of the pipeline software system without requiring initialization and re-execution of the end-to-end run of the pipeline from the initial element to the final element.

12. The computer program product as described in claim 11 wherein the information also includes event data generated by at least one UIMA Annotator in the UIMA pipeline.

13. The computer program product as described in claim 11 further including code to instrument the UIMA Annotator to generate the event data.

14. The computer program product as described in claim 11 further including a user interface through the development action is performed, the development action being one of: executing or debugging an element in a standalone manner, running a test to determine how deletion of an element affects the pipeline, running a test to determine how adding an element affects the pipeline, running a test to determine how a conditional execution of an element affects the pipeline, and building a code dependency tree.

15. The apparatus as described in claim 11 wherein the code configured to receive the information receives additional information about the state of the pipeline software system from one or more additional runs of the pipeline software system.

* * * * *